April 14, 1964     J. M. McCARTHY     3,129,376
ELECTRIC GENERATOR
Filed Feb. 26, 1962
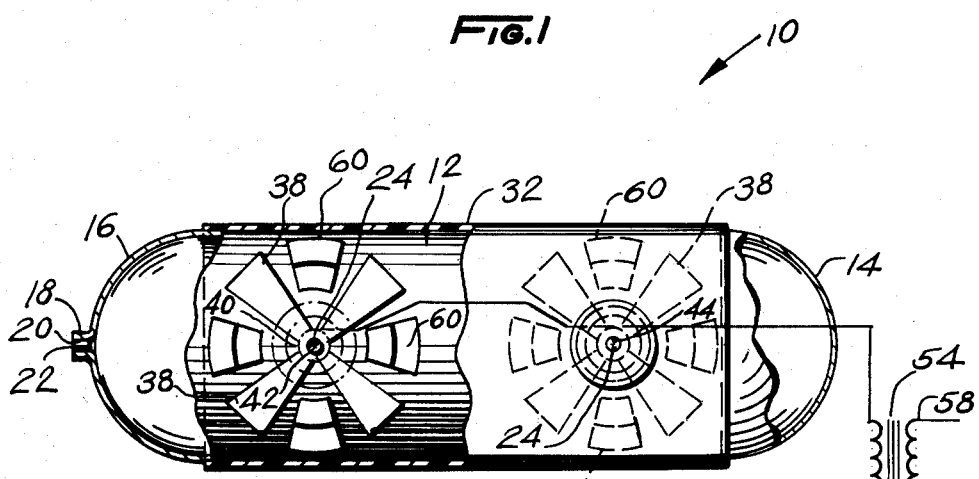
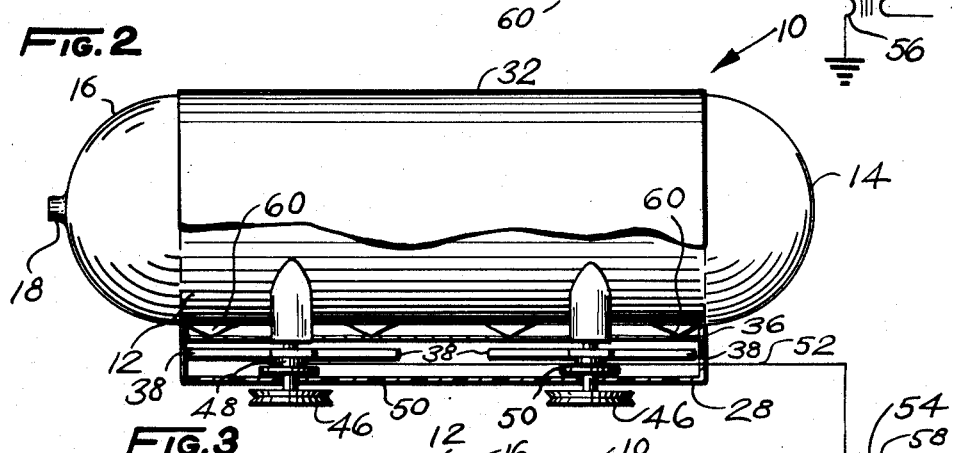
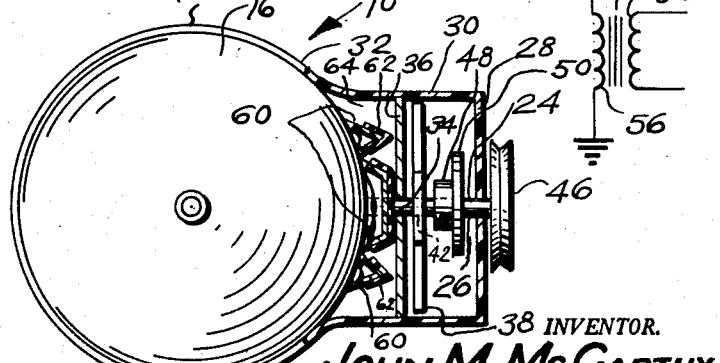
INVENTOR.
JOHN M. McCARTHY
John M. McCarthy United States Patent Office 3,129,376
Patented Apr. 14, 1964

3,129,376
ELECTRIC GENERATOR
John M. McCarthy, P.O. Box 2, Janesville, Wis.
Filed Feb. 26, 1962, Ser. No. 175,452
1 Claim. (Cl. 321—50)

This invention relates to improvements in electric generators.

It is an object of the present invention to provide an improved electric generator that requires less power to drive it than did the heretofore heavy armature types.

A statically-charged rod, brought near a substantially elongated conductor, induces electricity of the same polarity in the far end of the conductor, and it induces electricity of the opposite polarity in the near end of the conductor. Since electron flow constitutes current electricity, this is what occurs between the near end and the far end of the aforementioned conductor, thus proving static electricity can and has produced useable current electricity. Electrons can be attracted and repelled even when a thin layer of rubber is between the two charges; preventing their neutralizing each other, as is shown with the Van De Graaff electrostatic generator. It is, thus, recognized that this generator of static electricity works, thereby proving a thin layer of rubber is transparent to the attracting and repelling force of static electrical charges.

When an egg-shaped conductor is electrified, when it is tested with a proof plane, it will be found that all portions of the conductor are not equally charged. The density of the charges is greater at the smaller end than it is at the larger end. If the smaller end is extended, making it more pointed in configuration, the density of the charges will increase. The electrical density, or the quantity of charge per unit area, is, thus, greatest at the smallest area end of the conductor. Heretofore experiments also prove that electric charges reside on the outside of the conductor.

Another object of the present invention is to provide an improved electric generator that operates with a higher degree of efficiency than the prior art types.

Other objects of the invention are to provide an improved electric generator bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

FIGURE 1 is a front view of the present invention, shown in elevation, and partly broken away;

FIGURE 2 is a top plan view of FIGURE 1, shown partly broken away; and

FIGURE 3 is an enlarged end view of FIGURE 1.

Referring now more in detail to the drawing, an improved electric generator 10, made in accordance with the present invention, is shown to include an elongated and hollow tubular cylinder 12, having a rounded end 14, at one end, and a rounded end 16, at its other end. End 16 extends outwardly into a projection of circular configuration 18 having a circular opening centrally within which it frictionally receives a circular plug 22. A circular and elongated fiberglass shaft 24 is fixedly secured and projecting from cylinder 12 and is received rotatably within a circular opening 26 of a fiberglass wall 28 of hollow fiberglass rectangular projection 30 of sleeve 32 which is secured to the outer periphery of cylinder 12. Shaft 24 is freely and rotatably received within a circular opening 34 through inner wall 36 which is fixedly secured between the sides of projection 30. A plurality of vanes 38 radially spaced apart are fixedly secured to a circular hub 40, having a circular and central opening 42, which fixedly secures shaft 24 within the hub 40. A circular opening 44 transversely through pulley 46 fixedly receives the extended end of shafts 24, providing driving means for the vanes 38. A collector ring 48 is fixedly secured to each of the shafts 24 between the wall 28 and the vanes 38 and each ring 48 has a projecting and circular flange 50. A wire conductor 52 is in slidable engagement with the outer periphery of both collector rings 48 and extends outwardly from projection 30 to transformer 54 of which the primary winding 56 is grounded and a secondary winding 58 is connected to a load. A plurality of radially and equally spaced apart hollow projections 60 having arcuate points 62 are covered with a thin layer of rubber 64.

In operation, a charge of 500,000 volts or more is placed upon cylinder 12 by a Van De Graaff static-electricity generator and a heavy negative charge will concentrate at the points 62 of the electrodes 60 projecting from cylinder 12. Vanes 38 are completely covered with rubber, preventing any air around vanes 38 from becoming ionized. As the vanes 38 rotate past electrodes 60, one full cycle of alternating current is picked up by collector rings 48 and is sent flowing through the conductor wire 52 into the primary winding 56 of transformer 54.

It will thus be recognized that the vanes 38 can be driven by various means exterior of the invention.

While various changes may be made in the detail construction, it shall be understood that such changes shall be within the spirit and scope of the present invention as defined by the appended claim.

What I claim as new and desire to protect by Letters Patent of the United States is:

An improved generator comprising in combination a substantially elongated and tubular cylinder, a plug fixedly received within a projection of one end of said cylinder, a plurality of longitudinally and circumferentially spaced apart projections carried by said cylinder near one end and a plurality of longitudinally and circumferentially spaced apart projections on the other periphery of said cylinder near its other end, a pair of shafts of fiberglass material extending outwardly from the center between said longitudinally and circumferentially spaced apart projections and a substantially elongated fiberglass sleeve secured to the outer periphery of said cylinder, said sleeve projecting outwardly from said cylinder forming a projection having a front wall of substantially rectangular configuration and a top and bottom wall of rectangular configuration, said front wall having a pair of parallel, spaced apart substantially circular openings receiving a shaft of fiberglass material, said shaft being statically received within a circular opening through an internal wall within said projection, said wall of rectangular configuration being parallel with said front wall of said projection and being secured between said top and said bottom walls of said projection, a hub of circular configuration having a plurality of triangular vanes being fixedly secured to said shaft forwardly thereof, said inner wall of said projection and said shaft receiving a substantially circular collector ring having a forwardly poistioned and substantially circular flange, said collector rings being slidable and rotatable within a continuous conductor, said conductor extending outwardly from said projection of said sleeve and terminating in a primary winding of a transformer, said transformer being grounded at the end of said primary winding, a secondary winding of said transformer forming the output for the A.C. to a load, said driving means for said shafts comprising a pair of V-pulleys, said pulleys being driven by an external power source and vanes on hubs being rotated by said pulley, said cylinder having projecting electrodes which are rearwardly from said inner wall of said projection, said projection housing said electrodes, said projections forming said electrodes being covered substantially at their pointed tips by rubber and said vanes passing said electrodes picking up a charge on said cylinder consummating a cycle each time a vane passes said electrodes producing alternating current to said transformer.

References Cited in the file of this patent

UNITED STATES PATENTS

| | | |
|---|---|---|
| 568,176 | Tesla | Sept. 22, 1896 |
| 2,171,242 | Lindenblad | Aug. 29, 1939 |
| 2,590,168 | Felici | Mar. 25, 1952 |
| 2,681,122 | Streuber | June 15, 1954 |
| 2,791,684 | Newman | May 7, 1957 |
| 2,827,577 | Kimberlin | Mar. 18, 1958 |
| 3,028,685 | Silverman | Apr. 10, 1962 |

FOREIGN PATENTS

| | | |
|---|---|---|
| 135,587 | Sweden | May 6, 1952 |